United States Patent
Nettle et al.

(10) Patent No.: US 6,598,834 B2
(45) Date of Patent: Jul. 29, 2003

(54) METHOD FOR REDUCING FUEL CONSUMPTION IN AIRCRAFT

(75) Inventors: James E. Nettle, Carlsbad, CA (US); James R. Lord, Hampton (GB)

(73) Assignee: AeroTech Services Inc., Reno, NV (US)

(*) Notice: Subject to any disclaimer, the term of this patent is extended or adjusted under 35 U.S.C. 154(b) by 153 days.

(21) Appl. No.: 09/764,032

(22) Filed: Jan. 17, 2001

(65) Prior Publication Data

US 2002/0005461 A1 Jan. 17, 2002

Related U.S. Application Data

(60) Provisional application No. 60/182,252, filed on Feb. 14, 2000.

(51) Int. Cl.[7] ............................................. B64C 3/50
(52) U.S. Cl. ..................... 244/215; 244/219; 244/212
(58) Field of Search ................................. 244/198, 201, 244/219, 215, 211, 212

(56) References Cited

U.S. PATENT DOCUMENTS

| | | | | |
|---|---|---|---|---|
| 4,120,470 A | * | 10/1978 | Whitener | 244/213 |
| 4,131,253 A | | 12/1978 | Zapel | 244/219 |
| 4,471,927 A | | 9/1984 | Rudolph et al. | 244/215 |
| 4,471,928 A | * | 9/1984 | Cole | 244/215 |
| 4,542,868 A | | 9/1985 | Boyd | 244/198 |
| 4,725,026 A | | 2/1988 | Krafka | 244/219 |
| 4,741,503 A | | 5/1988 | Anderson | 244/203 |
| 4,867,396 A | | 9/1989 | Wainfan | 244/215 |
| 5,342,004 A | | 8/1994 | Bobbitt | 244/212 |
| 5,407,153 A | | 4/1995 | Kirk et al. | 244/199 |
| 5,740,991 A | * | 4/1998 | Gleine et al. | 244/203 |
| 5,839,699 A | * | 11/1998 | Bliesner | 244/214 |
| 5,908,176 A | * | 6/1999 | Gilyard | 244/130 |

OTHER PUBLICATIONS

Journal of Aircraft V34, Jul./Aug. 1997, Enhanced Airfoil Performance Using Small Trailing–Edge Flaps. A.W. Boyd.
Aviation Week & Space Technology, Apr. 30, 1979, The Ability to Reshape the Wing Airfoil Will Improve Aerodynamic Performance at all Speeds & Attitudes. Boeing.
ST 00384,SE, Aug. 1996, Federal Aviation Administration Supplemental Type Certificate.
Journal of ACFT vol. 3, No. 6, Nov.–Dec. 1966, Author: M.L. Olason, D.A. Norton Title: Aerodynamic Design Philosophy of the Boeing 737.
NASA TP–2969, 1990, Author: Charles Harris Title: NASA Supercritical Airfoils.
NASA/TM–1999–206586, 1999, Author: A. Bolonkin, G. Gillard Title: Estimated Benefits of Variable–Geometry Wing Camber Control For Transport Aircraft.

* cited by examiner

Primary Examiner—J. Woodrow Eldred
(74) Attorney, Agent, or Firm—Blakely, Sokoloff, Taylor & Zafman LLP

(57) ABSTRACT

A method and means are provided for increasing the aerodynamic efficiency of an airfoil employed by an aircraft. The method utilizes the primary flight control surfaces (11) (12) contiguous to the airfoil's trailing edge and relocates these devices to novel positions (21) (23) resulting in an expanded cord and enhanced camber for the aircraft wing (13). Self-adjusting push-pull rods (25) (60) replace conventional solid rods (24) where necessary in combination with a re-rigging of the flight control surfaces (11) (12) to predetermined positions (21) (23). Any voids created by this modification between the shared upper and lower fluid flow surfaces of the aircraft wing (13) and its flight control surfaces (11) (12) are eliminated through the installation of appropriate structure (40) or seal (43). Thus the aircraft wing (13) retains a unique geometric profile as a usual configuration.

32 Claims, 12 Drawing Sheets

METHOD FOR REDUCING FUEL CONSUMPTION IN AIRCRAFT

CROSS-REFERENCE TO RELATED APPLICATIONS

This application claims, and is entitled to, the benefit of Provisional Patent Application Ser. No. 60/182,252, filed Feb. 14, 2000, the specification of which is hereby incorporated by reference into the present application.

FEDERAL RESEARCH

Not applicable.

BACKGROUND

1. Field of Investigation

The present invention pertains to an aircraft wing or lifting airfoil that incorporates trailing edge flaps and ailerons as primary flight control surfaces; and improves the performance of said airfoil.

More particularly, this invention addresses the geometry and camber of the airfoil profile and improves the overall aerodynamic efficiency of the airfoil during its operation by means of relocating the trailing edge devices to predetermined positions.

In general, an airfoil is designed for a particular aircraft and the specific use of that aircraft. In most instances the lift and drag characteristics of any given airfoil can be further optimized using established aerodynamic principles.

BACKGROUND

2. Description of Prior Art

It is well known and extensively documented that changes in an airfoil's camber during various phases of flight produce optimal results. It has also been suggested that changing the shape of an airfoil's trailing edge, or attaching certain devices to it, will effectively alter the camber and increase airfoil efficiency.

An object of the present invention is to provide a new fixed camber, employed by the airfoil for the majority of the time that it is in operation, resulting in a greater lift-to-drag ratio and reduced fuel consumption for normal flight operations.

Accordingly, prior art describes and depicts various devices intended to change the camber of an airfoil in flight. Typical of such devices are those shown in the following patents:

U.S. Pat. No. 4,131,253, Zapel
U.S. Pat. No. 4,725,026, Krafka et al.
U.S. Pat. No. 4,741,503, Anderson et al.
U.S. Pat. No. 4,899,284, Lewis et al.
U.S. Pat. No. 5,740,991, Gleine et al.
U.S. Pat. No. 5,875,998, Gleine et al.
U.S. Pat. No. 6,010,098, Campanile et al.
U.S. Pat. No. 6,045,096, Rinn et al.
U.S. Pat. No. 6,076,775, Bauer U.S. Pat. No. 4,444,368, Andrews, narrows the re-cambering of the wing to a variable displacement of the aft flap.

U.S. Pat. No. 4,053,124, Cole, changes wing camber utilizing the leading and/or trailing edge devices and a flexible skin panel.

Wing camber changes are necessary and desirable during certain low speed aspects of flight, i.e., Take Off, Approach, Landing; and therefore leading edge devices and trailing edge flaps have been incorporated into the systems and operations of aircraft for decades.

To date the concept of changing an airfoil's camber during flight solely to produce optimal efficiency has yet to be put to practical use. Lack of practical mechanical designs, reliability, and functional hardware; restricts the use of these devices for aerodynamic, structural, and economic considerations.

An object of the present invention is to utilize all trailing edge devices of an airfoil to obtain maximum efficiency throughout the majority of the flight regime.

U.S. Pat. No. 4,867,396, Wainfan, installs a small fixed flap like device to the trailing edge of an airfoil without consideration of trailing edge flaps; or if trailing edge flaps are a part of the airfoil, without consideration of this device's effects upon the airfoil with trailing edge flaps deployed.

U.S. Pat. No. 5,265,830, Allen, installs a plate across the span of the trailing edge of an airfoil, and is only applicable to an airfoil having a blunt trailing edge.

U.S. Pat. No. 4,542,868, Boyd, attaches a wedge shaped flap at or near the trailing edge of an airfoil to improve the coefficient of lift and reduce the coefficient of drag. This effectively creates an airfoil having a blunt trailing edge with an increase in pressure drag at all but certain optimal airspeeds.

U.S. Pat. No. 5,088,665, Vijgen, Howard, Bushnell, Holmes, incorporates the attachment of a serrated panel to a lifting surface. While in theory this apparatus may improve lift or drag characteristics of an airfoil, the authors have made no claims regarding fuel efficiency in an aircraft.

An object of the present invention is to increase the coefficient of lift and decrease the coefficient of drag without attaching any external devices to the trailing edge of the airfoil.

U.S. Pat. No. 5,555,651, Henderson, describes a new configuration of a trailing edge flap for a wing which is effective during trailing edge flap extension only.

U.S. Pat. No. 5,342,004, Bobbitt, redesigns the surface contours of the final flap segment to enhance the performance of the airfoil. Altering surface contours may have undesirable aerodynamic effects and loads on aircraft mechanisms controlling the flap segments.

Replacement of conventional flight control surfaces with re-contoured flight control surfaces has not been accepted or proven in the aerospace community.

An object of the present invention is to change the camber of an airfoil without changing the shape or contour of any component of the airfoil.

U.S. Pat. No. 5,407,153, Kirk et al., mounts winglets on an existing Boeing 727 type airplane and re-rigs some of the wing trailing edge flight control surfaces in order to redistribute wing bending and shear loads and contribute to fuel mileage. In this instance the addition of winglets to the airfoil is the major contributing factor to the airfoil's improved performance.

In 1996 a Supplemental Type Certificate was issued by the Federal Aviation Administration for a modification to the neutral settings of the inboard and outboard ailerons and aft flap segments on Boeing 727 type aircraft; which is now incorporated into a noise abatement modification for Boeing 727 aircraft. It should be noted that the above two modifications to the Boeing 727 aircraft result in limiting trailing edge flap extension.

An object of the present invention is to provide a mechanical means for an aircraft wing to attain optimal camber for the majority of the time it is in operational use, and yet allow normal operation of the wing leading and trailing edge devices.

The aforementioned prior art, some of which is theoretical and some of which has practical applications, does not provide passive drag reduction and lift improvement utilizing the airfoil and the airfoil's trailing edge components originally supplied by the aircraft manufacturer. An object of the present invention is to increase airfoil efficiency, or the lift-to-drag ratio, employing existing major components of the aircraft wing to enhance the aerodynamics.

SUMMARY

In accordance with the present invention a system of repositioning all wing trailing edge flight control surfaces to a predetermined position in order to obtain an increase in the lift-to-drag ratio, resulting in reduced fuel consumption for any distance flown.

OBJECT AND ADVANTAGES

Accordingly, several objects and advantages of the present invention are:
(a) to provide an airfoil with a new fixed camber resulting in a greater lift-to-drag ratio;
(b) to provide an airfoil with increased aerodynamic efficiency without attaching any external devices to the trailing edge of the airfoil;
(c) to provide an airfoil with an optimal camber for the majority of the time it is functioning and not restrict the operation of said airfoil's flight control surfaces;
(d) to provide an airfoil with means for changing said airfoil's geometric profile without changing the shape or contour of any component of the airfoil;
(e) to provide an airfoil with significant performance improvement through the use of all trailing edge devices on said airfoil;
(f) to provide an airfoil for an aircraft which gives the aircraft the capability to climb to a higher initial cruising altitude;
(g) to provide an airfoil for an aircraft which gives the aircraft an increased rate of climb;
(h) to provide an airfoil for an aircraft that has superior aerodynamic efficiency while the aircraft is in a cruising mode; and
(i) to provide an airfoil for an aircraft which reduces the quantity of fuel consumed by said aircraft over any given distance flown.

Further objects and advantages are to provide an airfoil with increased lift and reduced drag characteristics that is able to lift an aircraft from a given surface to a higher altitude in any specific time; thus reducing perceptible sound decibel levels in the vicinity of the aircraft's departure. This airfoil's aerodynamic efficiency will also reduce total powerplant emissions as a result of the reduction of fuel consumed for a given flight. Still further objects and advantages will become apparent from a consideration of the ensuing description and drawings.

DRAWING FIGURES

The drawings depict the present invention as applied to the left hand wing of a Boeing 737 type aircraft However, it is understood that all wings on an aircraft are treated identically.

FIG. 1 illustrates the association and position of trailing edge flight control devices on the aircraft wing.

FIG. 1A views the aircraft wing from behind with the trailing edge flaps extended.

Figure 1:
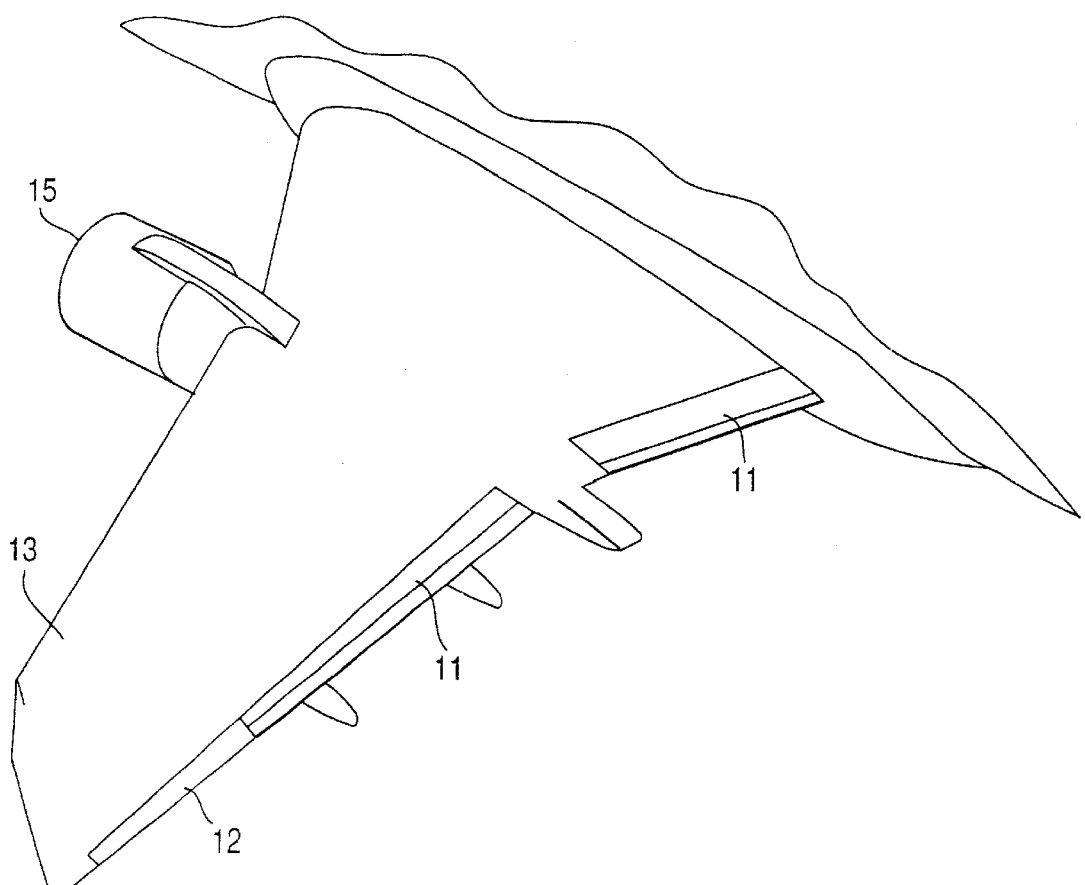
Figure 1A:
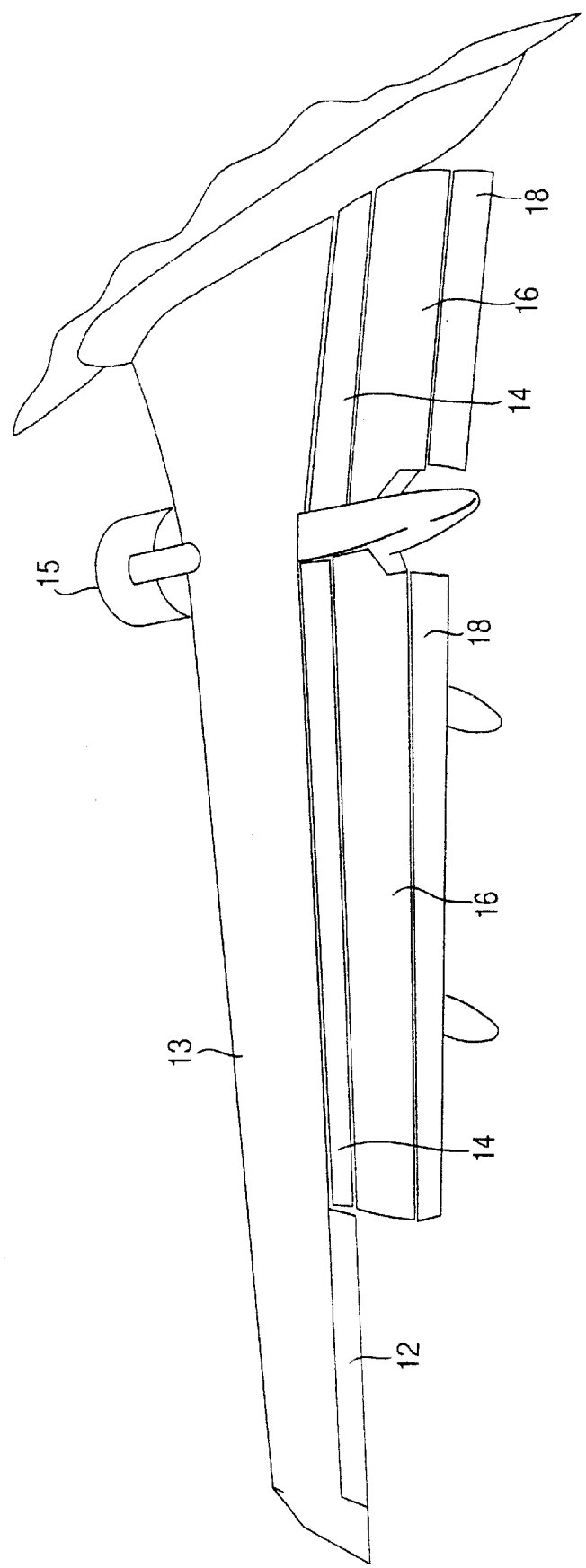

| Reference Numerals In Drawings | |
|---|---|
| 11 trailing edge flaps | 12 aileron |
| 13 aircraft wing | 14 fore flap |
| 15 powerplant | 16 mid flap |
| 18 aft flap | 20 aileron neutral position |
| 21 aileron predetermined position | 22 aft flap original position |
| 23 aft flap predetermined position | 24 original push-pull rod |
| 25 self-adjusting extendible push-pull rod | 26 alloy stop |
| 28 aft flap track | 31 adjustable rod end |
| 32 locking nut | 33 sliding shaft |
| 34 cylinder | 35 flange |
| 36 boss | 37 internal spring |
| 40 skin extension | 41 splice |
| 42 fastener | 43 bulb seal |
| 44 seal retainer | 50 right-angled bellcrank |
| 52 horizontal cam track | 54 elongated bellcrank |
| 56 cable driven drum | 58 cam slot |
| 59 configuration change | 60 self-adjusting compressible push-pull rod |

DESCRIPTION—PREFERRED EMBODIMENT

Figure 2:
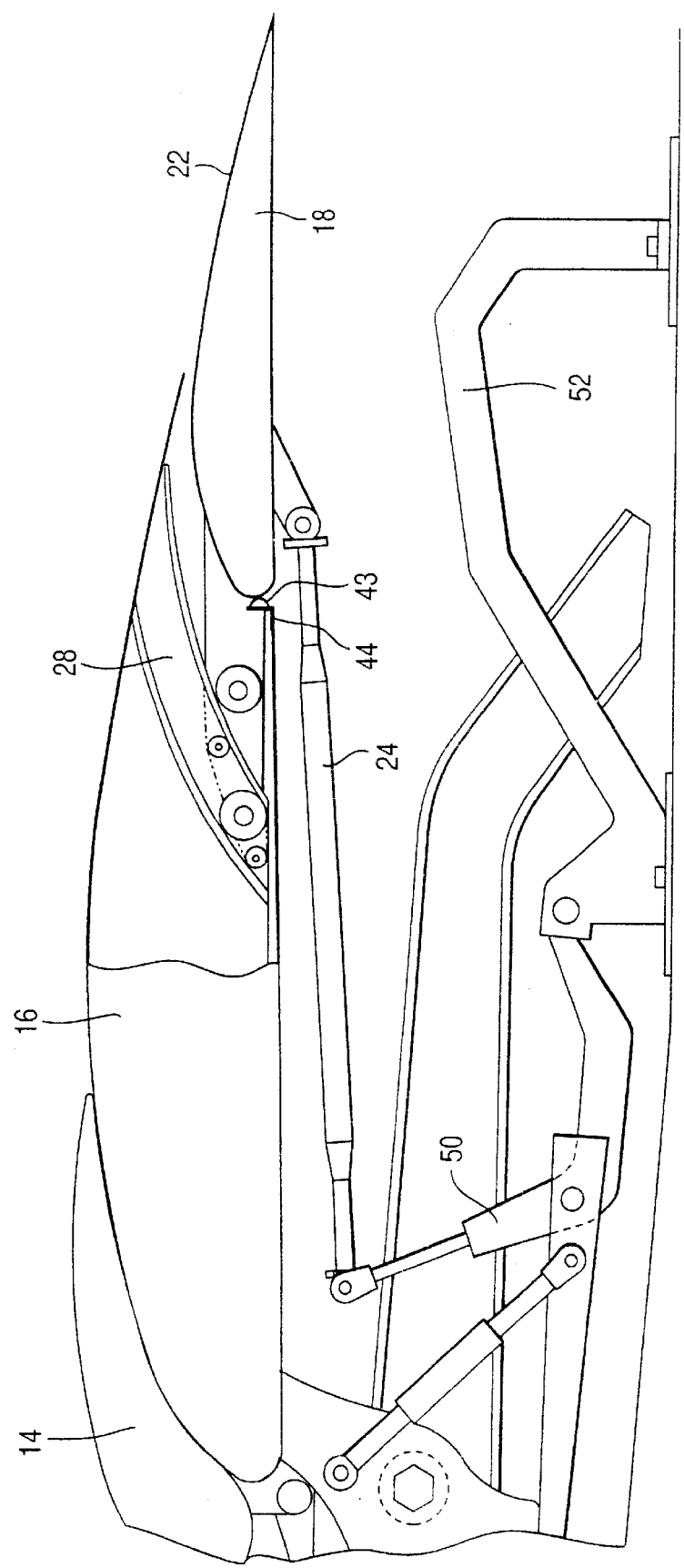
FIG. 2 is a profile depicting the inter-relationship of the trailing edge flap segments when retracted.
Figure 2A:
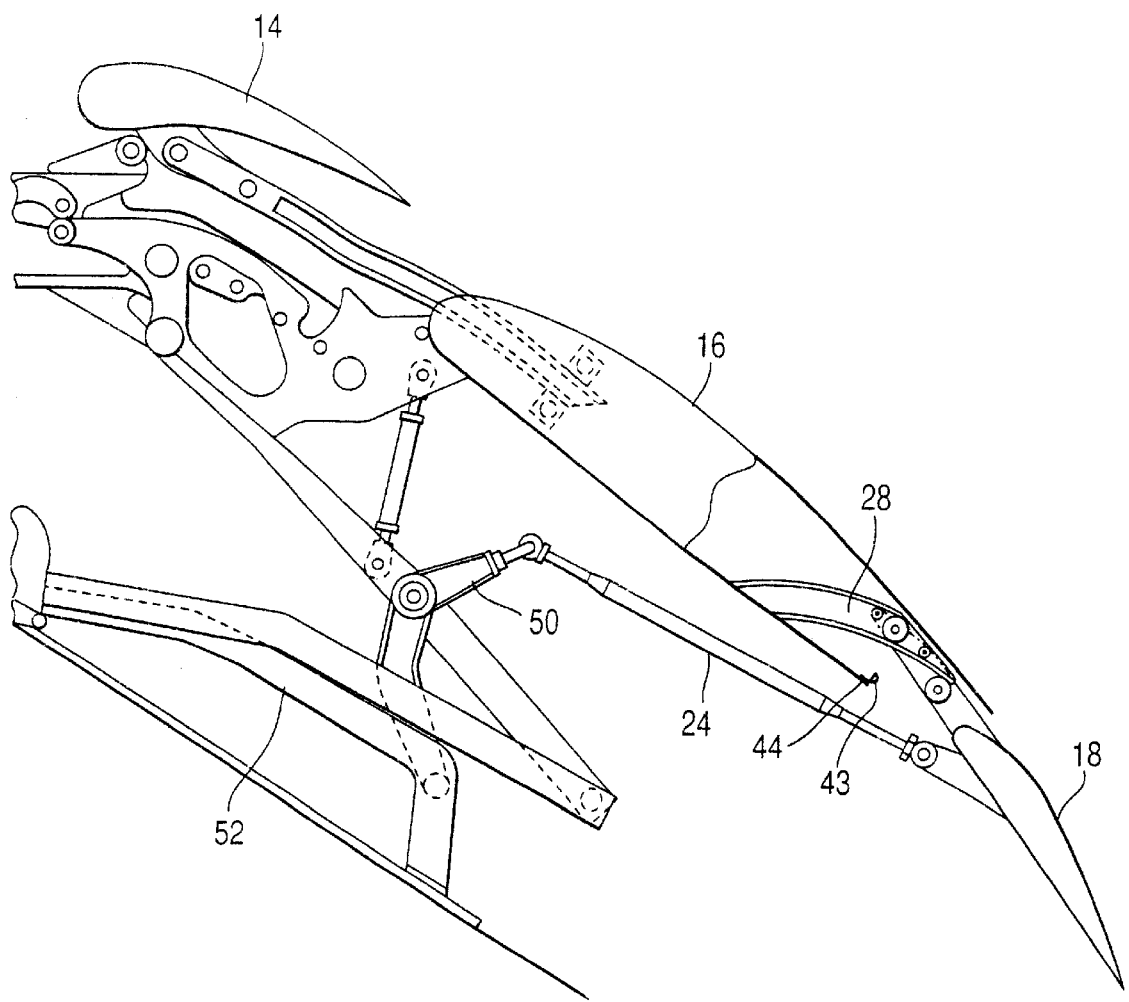
FIG. 2A is a profile depicting the inter-relationship of the trailing edge flap segments when extended.

A preferred embodiment of the airfoil of the present invention employs a multi-segmented trailing edge flap system equivalent to the flap system of a Boeing 737 type aircraft. The association of the trailing edge flaps 11 and ailerons 12 to the aircraft wing 13 is depicted in FIG. 1. The trailing edge flaps 11 of the Boeing 737 aircraft are composed of a section inboard and a section outboard of the under-wing mounted powerplant 15. The inter-relationship of the trailing edge flap segments, (fore flap 14, mid flap 16, and aft flap 18), is illustrated in FIG. 2 and FIG. 2A. Each section of aft flap 18 is positioned by two push-pull rods 24, and transits on two aft flap tracks 28 installed in the mid flap 16.

Figure 3:
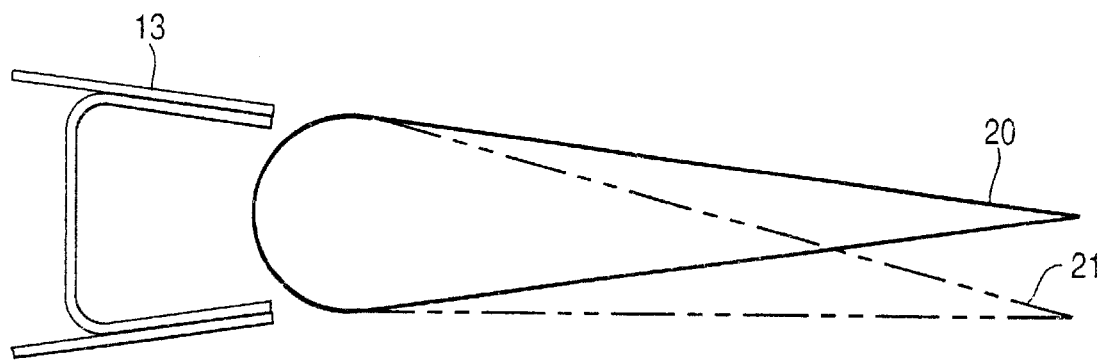
FIG. 3 is a side view of aileron positions.

The aileron neutral position 20 (FIG. 3) is altered to a predetermined position 21 situating the trailing edge of the aileron 12 below the unmodified neutral setting; utilizing standard maintenance and rigging practices for the aircraft involved.

Figure 4:
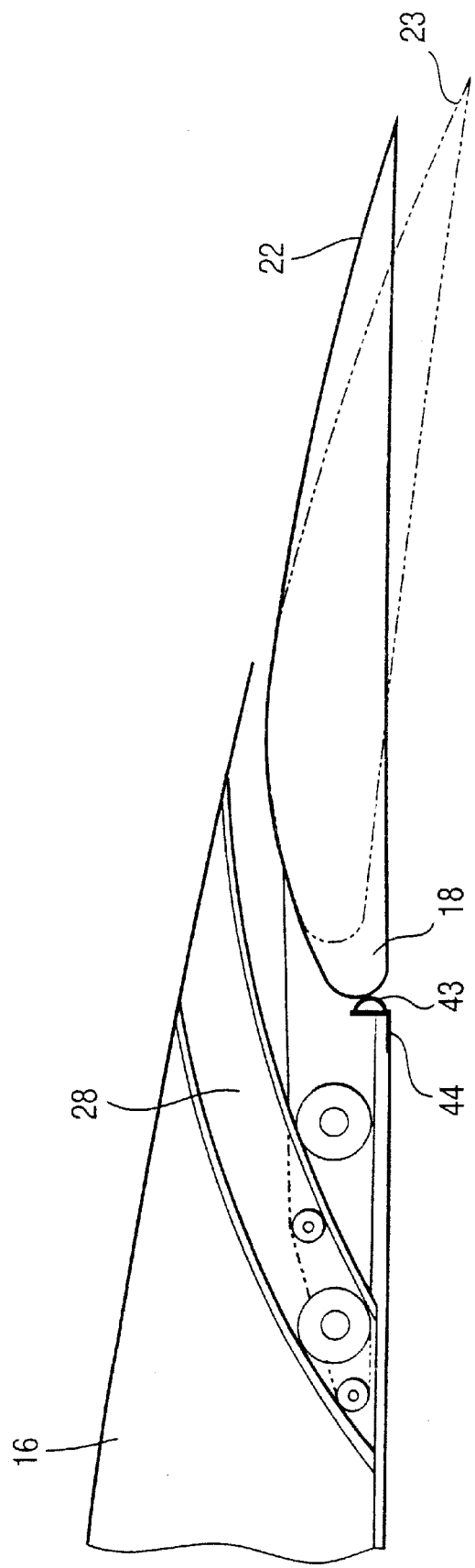
FIG. 4 is a side view of aft flap positions.
Figure 5:
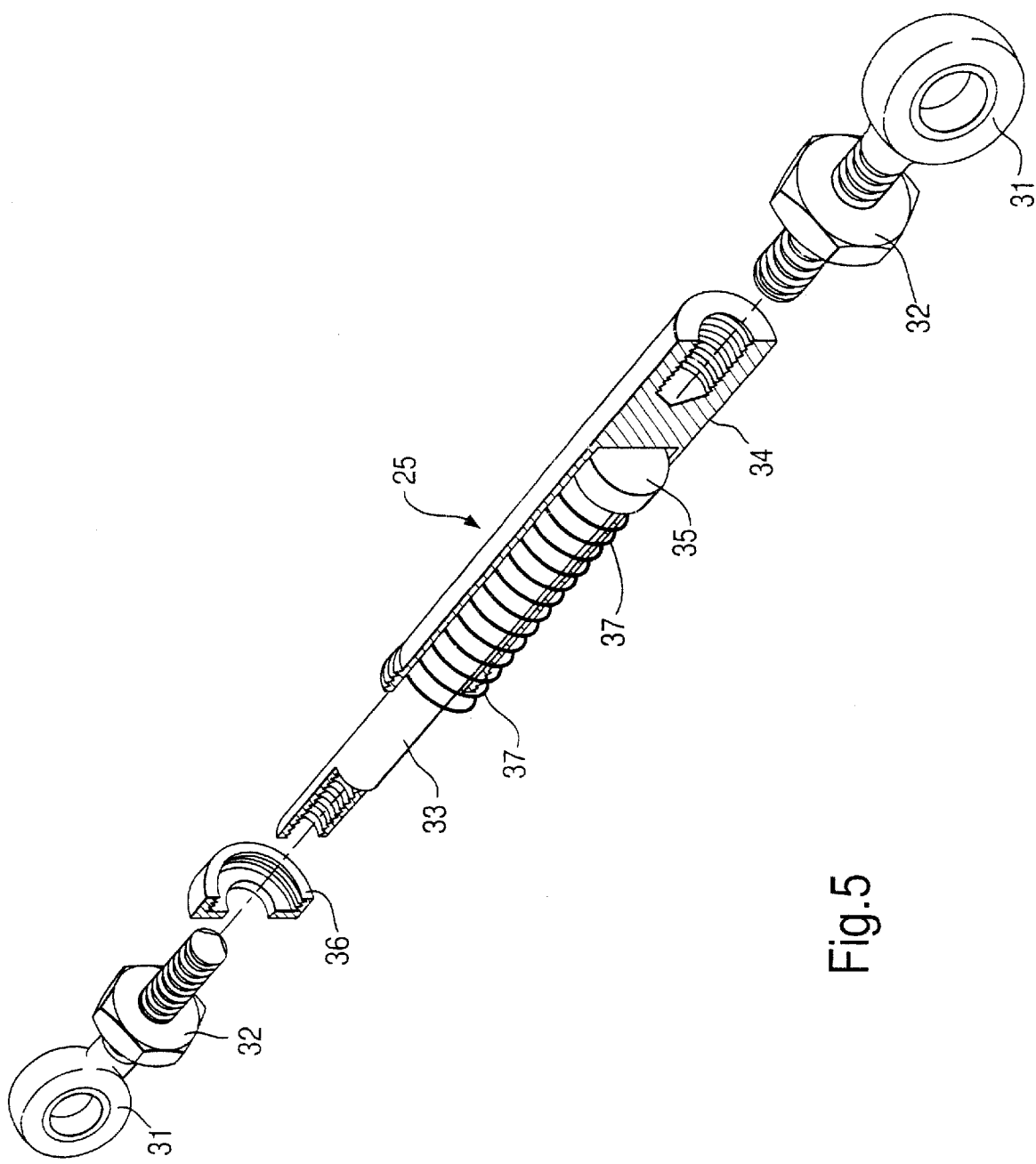
FIG. 5 is a perspective view of a self-adjusting extendible push-pull rod.

The aft flap segments 18 are relocated to a predetermined position 23 aft and below their original positions 22 as depicted in FIG. 4. This is accomplished by replacing the existing push-pull rods 24, which control the position of the aft flap segments 18, with distinctive self-adjusting extendible push-pull rods 25 (FIG. 5) of equal length. The forward, or retracted, travel of the aft flap 18 is limited by welding an alloy stop 26 (FIG. 6) on the aft flap tracks 28 which locates the aft flap 18 in its predetermined position 23 when the trailing edge flaps 11 are retracted.

When static, the new rods 25 are of sufficient length to position the aft flap 18 as originally intended when the flaps 11 are extended. Both ends of the new rods 25 have adjustable rod ends 31 identical to the original rods 24, including locking nuts 32. A sliding shaft 33 and a cylinder 34 are manufactured from recognized aircraft quality alloys with properties that exceed the virtues of the original rods 24. The lengths of both the sliding shaft 33 and the cylinder 34 are greater than one half the length of the original rods 24.

The sliding shaft 33 is solid and round, with a congruent flange 35 approximately equal in diameter to the inner diameter of the cylinder 34 and located at the opposite end of the shaft 33 from the rod end 31. The outside diameter of the shaft 33 is approximately equal to the diameter of an orifice in a boss 36.

The cylinder 34 is round with an outside diameter approximately equal to the original rods 24. The cylinder 34 has a bored cavity of sufficient diameter and depth to accommodate the sliding shaft flange 35 and an internal spring 37. The depth of the bored cavity is calculated to allow internal spring 37 compression when the aft flap 18 engages the stop 26 on the aft flap tracks 28 during flap retraction; and normal aft flap 18 positioning upon flap extension. A boss 36 is threaded on the bored end of the cylinder 34 to provide a guide for the sliding shaft 33 and retain the internal spring 37.

An internal spring 37 is installed around the sliding shaft 33 and between the flange 35 and the boss 36, inside the bored cavity of the cylinder 34. The length and rigidity of the internal spring 37 are calculated to provide accurate aft flap 18 position during flap extension, and spring 37 compression during flap retraction when the aft flap 18 engages the stop 26 on the aft flap track 28.

Figure 6:
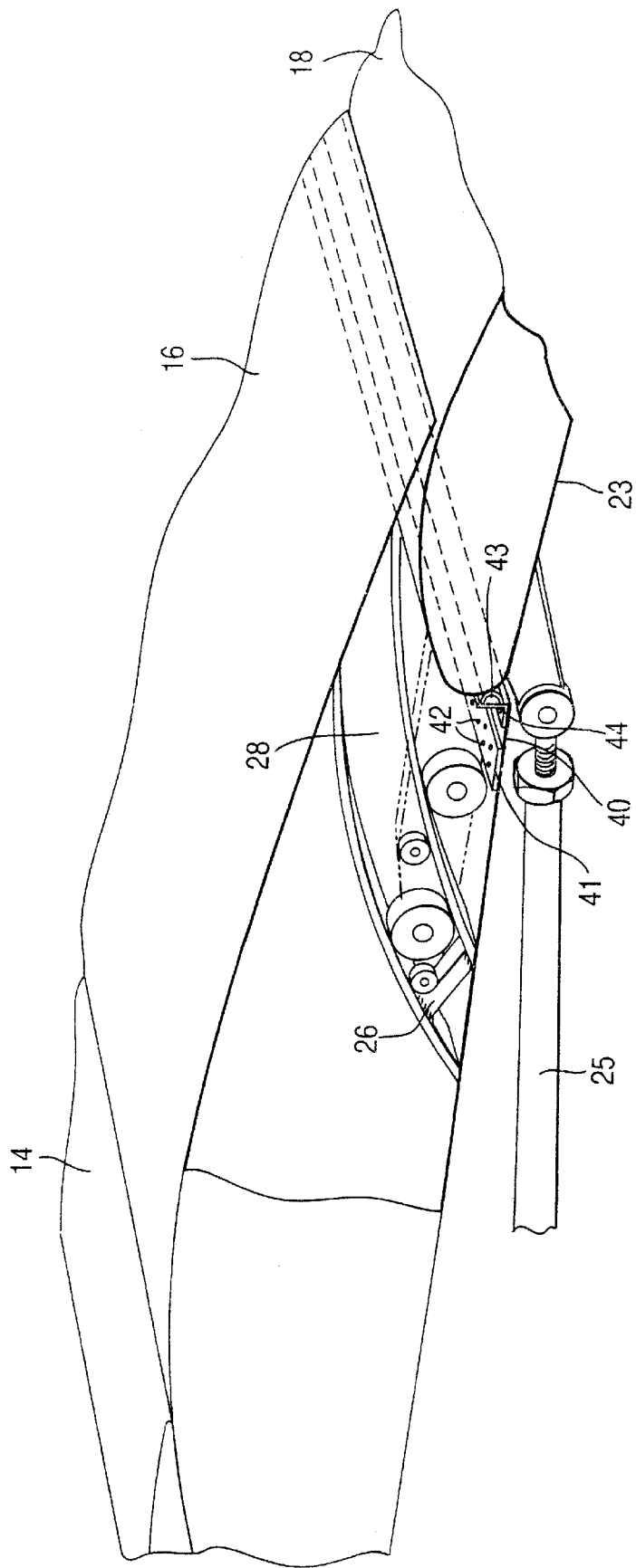
FIG. 6 is an isometric view of this inventions modifications to the trailing edge flaps.
Figure 7:
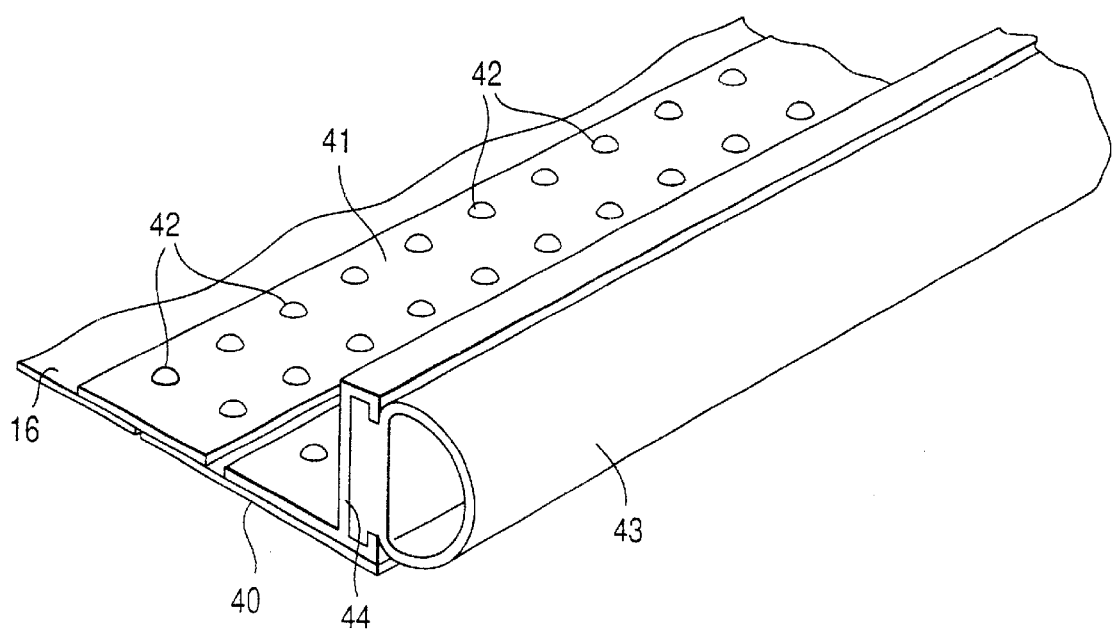
FIG. 7 illustrates structure used to close a void in the trailing edge flaps.

Re-situating the aft flap 18 to the predetermined position 23 creates a void between the mid flap 16 and the aft flap 18 which disrupts the even aerodynamic surface of the aircraft wing 13. This void is eliminated by the addition of a skin extension 40 to the lower surface of the mid flap 16 (FIG. 6). The skin extension 40 is manufactured from the same material as the lower surface of the mid flap 16 and is of sufficient width to cover the void when the trailing edge flaps 11 are retracted. The skin extension 40 (FIG. 7) is mounted on the same plane as the lower surface of the mid flap 16 with a splice 41 that extends the entire span of the mid flap 16 and the skin extension 40. Current accepted aircraft maintenance and repair practices govern the gauge, width, and material properties of the splice 41; and the quantity, placement, and type of fastener 42 utilized. The aircraft's original bulbseal 43 and seal retainer 44 are then reinstalled on the skin extension 40 in a position to contact the leading edge of the aft flap 18 when the trailing edge flaps 11 are retracted.

It becomes evident that the above described method and means:

(a) allow the primary flight control surfaces of an aircraft wing to be operated as originally intended,
(b) creates a unique airfoil geometric profile when the primary flight control surfaces of the wing are in the neutral, or normal, position, and
(c) will improve the aerodynamic efficiency of an airfoil by increasing the lift-to-drag ratio.

OPERATION OF INVENTION

This invention functions passively and operates through the utilization of aerodynamic principles. It is known from classical aerodynamic theory that a more highly cambered than usual trailing edge section will improve overall airfoil lifting efficiency and reduce the coefficient of drag. The desirable properties and efficiency of the airfoil are maximized during the vast majority of the time that the airfoil is operating. Special operational or flight procedures are not required; pilots and maintenance personnel will perform their respective duties in the same manner as they did previously.

When use of the trailing edge flaps 11 is necessary, the internal spring 37 in the extendible push-pull rods 25 maintains an overall rod length equal to the original push-pull rods 24, assuring that the aft flap 18 is positioned as originally intended by the aircraft manufacturer. As the trailing edge flaps 11 are retracted for climbing and cruising the stops 26 on the aft flap tracks 28 limit the forward and upward travel of the aft flap 18 to it's predetermined position 23, and the extendible push-pull rods 25 lengthen in order to accommodate the remainder of the retraction motion of the mid flap 16 and fore flap 14. The skin extension 40 and the bulb seal 41 close the void between the mid flap 16 and aft flap 18 when the trailing edge flaps 11 are retracted; leaving the aft flap 18 in it's predetermined position 23. This increases the camber and extends the chord of the airfoil. The re-positioning of the aileron 12 to it's predetermined position 21 contributes to the new geometric profile of the airfoil.

Alternative Embodiment

Another possibility with regard to repositioning the aft flap 18 to a predetermined position 23 for increased airfoil efficiency when the trailing edge flaps 11 are retracted utilizes the mechanisms that control the position of the push-pull rods 24 for aft flap 18 extension and retraction.

Figure 8:
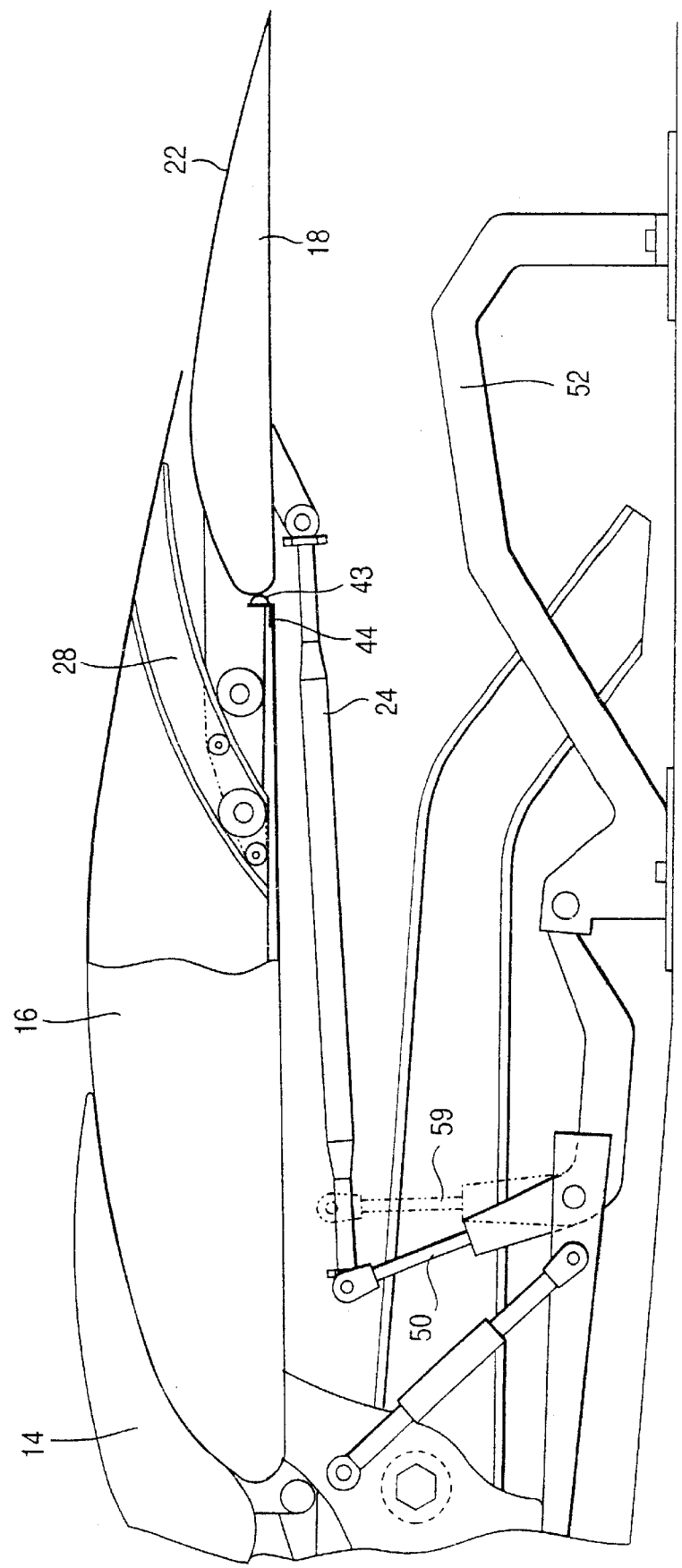
FIG. 8 is a profile of the mechanisms that position the outboard aft flap.
Figure 9:
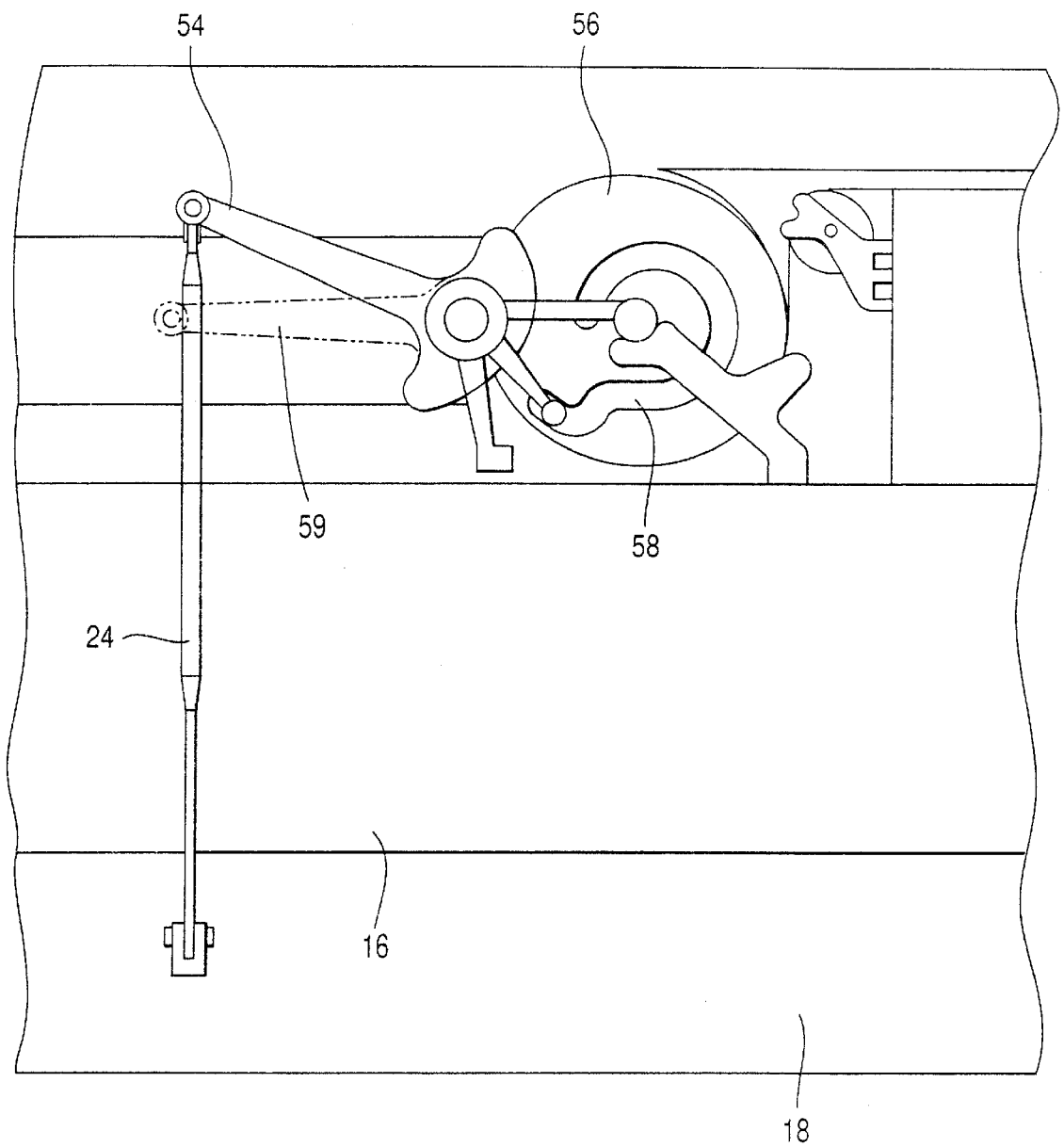
FIG. 9 is a view looking down into the inboard mid flap depicting the mechanisms that position the inboard aft flap.

The aft flap 18 of the outboard section of flaps 11 is positioned by a right-angled bellcrank 50 (FIG. 8) attached to the rod end 31 of each push-pull rod 24. The bellcrank 50 is allowed to pivot about a central point as a horizontal cam track 52, at the distal end of the bellcrank 50 from the rod end 31, imparts a forward or aft motion to the bellcrank 50 extremity attached to the rod end 31; thus dictating aft flap 18 position. The mid flap 16 of the inboard section of trailing edge flaps 11 contains an elongated bellcrank 54 (FIG. 9) that pivots about a point near a cable driven drum 56 with a cam slot 58. The end of the elongated bellcrank 54 proximate to the cable driven drum 56 has a lobe which travels in the cam slot 58 providing forward and aft movement to the opposite end of the bellcrank 54. The rod end 31 of the push-pull rod 24 is attached to the distal end of the bellcrank 54 from the cam slot 58. The forward and aft movement of the bellcrank 54 positions the aft flap 18 during trailing edge flaps 11 extension and retraction.

A change to the configuration 59, of the right-angled bellcrank 50 and the elongated bellcrank 54, to provide an attach point for the push-pull rods 24 that is closer to the aft flap 18, would allow the aft flap 18 to be moved down and aft to it's predetermined position 23 when the trailing edge flaps 11 are retracted. The aft flap tracks 28 inherently limit the rearward travel of the aft flap 18 by design. The change to the configuration 59 of the bellcranks 50 and 54 would not allow full extension of the trailing edge flaps 11 utilizing the original push-pull rods 24, as they would push the aft flap 18 to the aft flap track 28 limit before the fore flap 14 and mid flap 16 reached full deployment; damaging components in the trailing edge flaps 11 system.

Figure 10:
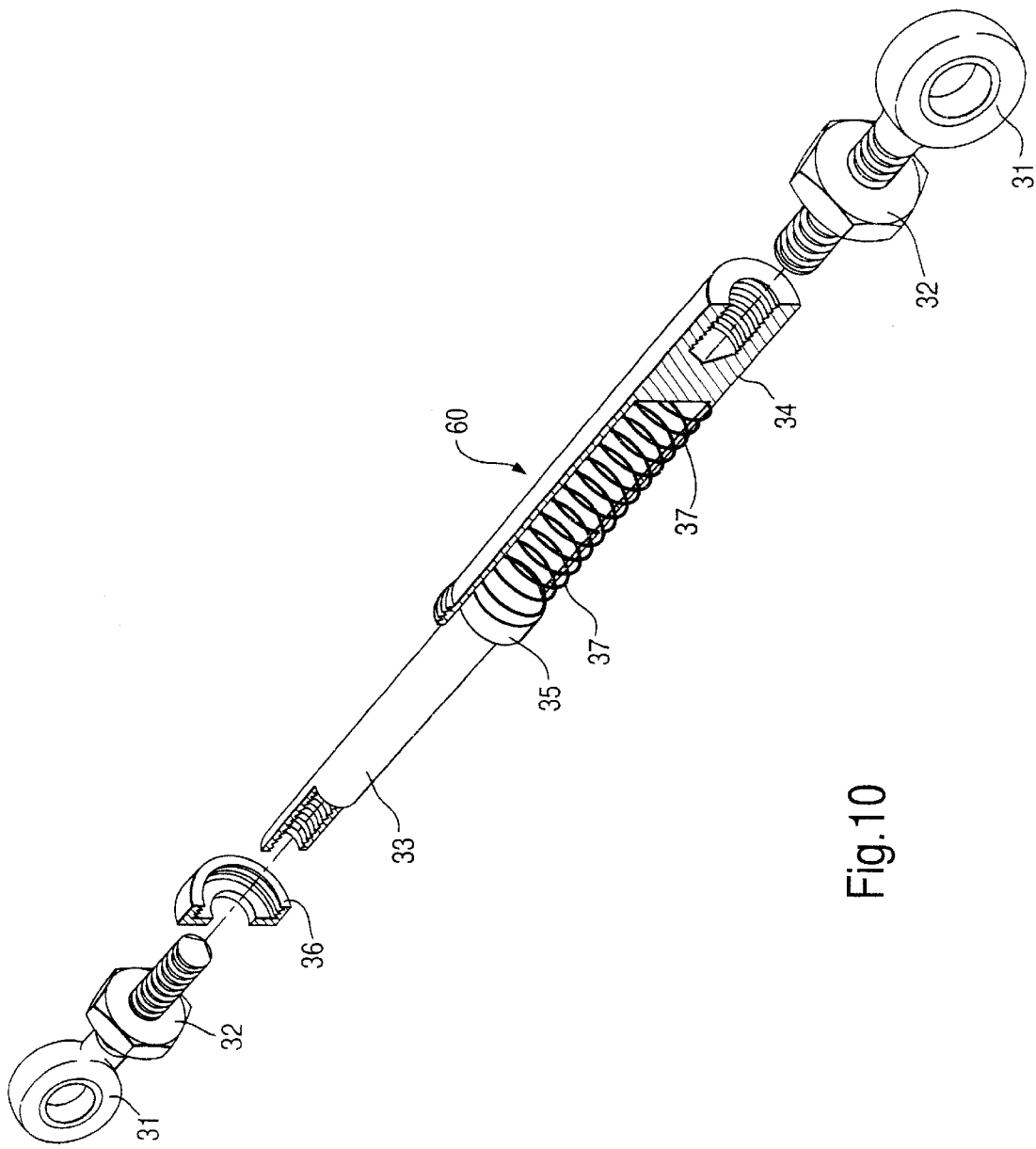
FIG. 10 is a perspective view of a self-adjusting compressible push-pull rod.

This method requires replacing the original push-pull rods 24 with a self-adjusting compressible push-pull rod 60 (FIG. 10). The compressible rods 60 have the same material properties and components as the extendible rods 25. However, in this case the internal spring 37 is installed between the flange 35 and the bottom of the bored cavity in the cylinder 34, and it's length and rigidity are calculated to provide accurate aft flap 18 positions until spring 37 compression becomes necessary to allow the flaps 11 to be fully extended. When static the compressible rods 60 are of sufficient length to situate the aft flap 18 in it's predetermined position 23, and the combined lengths of the sliding shaft 33 and the cylinder 34 approximate the length of the original rods 24. Again, a void is created between the mid flap 16 and aft flap 18 when the flaps 11 are retracted. The void would be treated, as in the preferred embodiment, with a skin extension 40, bulbseal 43, and seal retainer 44; installed with a splice 41 and fasteners 42.

As described in the preferred embodiment, the aileron neutral position 20 (FIG. 3) is altered to a predetermined position situating the trailing edge of the aileron 12 below the unmodified neutral setting. This is accomplished utilizing standard maintenance and rigging practices for the aircraft involved.

This embodiment allows the aft flap 18 to be relocated to a predetermined position 23 when the flaps 11 are retracted, and assures correct aft flap 18 positions throughout the course of flaps 11 extension. The compressible rods 60 permit full extension of the fore flap 14 and mid flap 16 when the aft flap 18 reaches the limits of the aft flap tracks 28. The re-positioning of the aileron 12 to it's predetermined position 21 contributes to the new geometric profile of the airfoil.

Conclusions, Ramifications, and Scope of the Invention

Thus the reader will see that the method employed and the attending mechanisms used to accomplish said method produce an airfoil with a lengthened chord and a redefined positive camber. This highly cambered trailing edge area of the airfoil will improve span wise loading, reduce drag, and enhance lifting efficiency. The increased lift-to-drag ratio results in decreased fuel consumption for any distance flown for the vehicle operating with said airfoil. In addition, the airfoil of the present invention imparts unto an aircraft the capability to climb to a higher initial cruising altitude at an increased rate of climb, and provides exceptional efficiency while the aircraft is in cruise flight.

Furthermore, the present invention has the additional advantages in that:

(a) it does not necessitate the addition of any external devices to the trailing edge of the airfoil;

(b) it does not require the alteration or re-contouring any of the airfoil's flight control surfaces;

(c) it permits normal operation of any leading edge or trailing edge apparatus inherent to the airfoil;

(d) the reduction in fuel consumed by any vehicle employing said airfoil results in lower emissions from the vehicles powerplant(s) into the atmosphere; and (e) a higher rate of climb for an aircraft equipped with the airfoil of the present invention will reduce the perceptible sound decibel levels in the area below the aircraft.

While the above description contains many specificities, these should not be construed as limitations on the scope of the invention, but rather as an exemplification of one preferred embodiment thereof. Many other variations are possible. For example the structure used to seal the void created between flap segments could be installed utilizing various techniques such as bonding, welding, or bracing with gussets; and structure material could be anything considered airworthy. The shape of the stop on the aft flap track can vary as long as it functions as intended; and it could be fabricated from metal, phenolic, or a durable composite material. The stop can be installed utilizing any structurally sound method; considering the intended purpose of the stop. As much as practical, the shape and substance of the extendible or compressible push-pull rods and their components can change; and the material properties and characteristics of the internal spring should change to accommodate different air loads or aircraft.

As regarding other aircraft types, each distinct aircraft trailing edge system is modified differently in order to realize an optimal airfoil efficiency. A flap system employing a single flap would reposition that single flap when retracted; and a multi-segmented flap system only repositions the aft segment when the flaps are retracted. The precise means of accomplishing this repositioning will vary in accordance with the mechanisms used to extend and retract the trailing edge flaps of the aircraft wing. However, the use of extendible or compressible push-pull rods, and/or changing the contour or configuration of bellcranks, and eliminating voids or non-aerodynamic areas, are elements that could be incorporated. Aileron repositioning should be achieved using standard maintenance and rigging procedures for the aircraft involved.

Accordingly, the scope of the invention should be determined not by the embodiment(s) illustrated, but by the appended claims and their legal equivalents.

We claim:

1. A method of modifying existing Boeing 737 type aircraft to increase the lift-to-drag ratio of the wings when the flaps are retracted, the flaps having fore, mid and aft flap segments, comprising:

repositioning the aft flap segments when in the flaps retracted position to a position aft and below their original positions without effecting flap movement limits when not in the flaps retracted position, and, filling the voids created to maintain an even aerodynamic surface for fluid flow over the flaps;

whereby the method increases the aerodynamic efficiency of the wings by increasing the lift-to-drag ratio when the flaps are in the new, flap retracted position.

2. The method of claim 1 wherein the aft flap segments are repositioned by providing a stop to prevent full retraction of the aft flap segments, and providing aft flap segment actuating members having a self-adjusting push-pull rod for the deployment and retraction of the aft flap segments.

3. The method of claim 1 wherein the fore flap segments and mid flap segments are not repositioned.

4. The method of claim 3 wherein all aileron neutral positions are also altered to a predetermined positions below the unmodified neutral aileron settings, whereby all aft airfoil sections are altered to predetermined positions below their unmodified positions.

5. The method of claim 4 wherein the aileron neutral positions are altered utilizing standard maintenance and rigging practices for the 737 type aircraft.

6. The method of claim 1 wherein all aileron neutral positions are also altered to a predetermined positions below the unmodified neutral aileron settings, whereby all aft airfoil sections are altered to predetermined positions below their unmodified positions.

7. The method of claim 6 wherein the aileron neutral positions are altered utilizing standard maintenance and rigging practices for the 737 type aircraft.

8. A method of modifying existing Boeing 737 type aircraft having multiple flap segments, including fore, mid and aft flap segments, and having predetermined original flap positions, including an original flap retracted position and original flap extended positions, to increase the lift-to-drag ratio of the wings when the flaps are retracted, comprising:

limiting the aft flap segment retraction to define a new aft flap segment retracted position between the original aft flap segment retracted position and an original aft flap segments extended position without effecting the original flap segment movement limits when not in the flaps retracted position; and, filling the voids created to maintain an even aerodynamic surface over the flaps;

whereby the method increases the aerodynamic efficiency of the wings by increasing the coefficient of lift and decreasing the coefficient of drag when the flaps are in the new, flap retracted position.

9. The method of claim 8 wherein the aft flap segments are repositioned by providing a stop to prevent full original retraction of the aft flap segments, and providing aft flap segment actuating members having a self-adjusting push-pull rod for the deployment and retraction of the aft flap segments.

10. The method of claim 8 wherein the fore flap and mid flap segments are not limited in the retraction to their original positions.

11. The method of claim 10 wherein all aileron neutral positions are also altered to predetermined positions below the original neutral aileron settings, whereby all aft airfoil sections are altered to predetermined positions below their unmodified positions.

12. The method of claim 8 wherein all aileron neutral positions are also altered to predetermined positions below the original neutral aileron settings, whereby all aft airfoil sections are altered to predetermined positions below their unmodified positions.

13. A method of modifying an existing aircraft to increase the lift-to-drag ratio of the wings when the flaps are retracted, the flaps having multiple flap sections, including aft-most flap sections, comprising:

repositioning the aft-most flap sections when in the flaps retracted position to a position below their original positions without effecting flap movement limits when not in the flaps retracted position, and, filling the voids created to maintain an even aerodynamic surface for fluid flow over the flaps;

whereby the method increases the aerodynamic efficiency of the wings by increasing the lift-to-drag ratio when the flaps are in the new, flap retracted position.

14. The method of claim 13 wherein the aft-most flap sections are repositioned by providing a stop to prevent full retraction of the aft-most flap sections, and providing aft-most flap section actuating members having a self-adjusting push-pull rod for the deployment and retraction of the aft-most flap sections.

15. The method of claim 13 wherein other flap sections are not repositioned.

16. The method of claim 15 wherein the aileron neutral position is also altered to a predetermined position below the unmodified neutral aileron setting.

17. The method of claim 13 wherein the aileron neutral position is also altered to a predetermined position below the unmodified neutral aileron setting.

18. A method of modifying existing aircraft having multiple section flaps, including aft-most flap sections, and having predetermined original flap section positions, including original flap retracted positions and original flap extended positions, to increase the lift-to-drag ratio of the wings when the flaps are retracted, comprising:

limiting the aft-most flap section retraction to define a new aft-most flap section retracted position between the original aft-most flap section retracted position and an original aft-most flap section extended position without effecting the original flap movement limits when not in the flaps retracted position; and, filling the voids created to maintain an even aerodynamic surface over the flaps;

whereby the method increases the aerodynamic efficiency of the wings by increasing the lift-to-drag ratio when the flaps are in the new, flap retracted position.

19. The method of claim 18 wherein the aft-most flap sections are repositioned by providing a stop to prevent full original retraction of the aft-most flap sections, and providing aft-most flap section actuating members having a self-adjusting push-pull rod for the deployment and retraction of the aft-most flap sections.

20. The method of claim 18 wherein other flap sections are not limited in the retraction to their original positions.

21. The method of claim 20 wherein the aileron neutral position is also altered to a predetermined position below the original neutral aileron setting.

22. The method of claim 18 wherein the aileron neutral position is also altered to a predetermined position below the original neutral aileron setting.

23. A method of modifying an airfoil, the airfoil including a wing and at least one trailing edge device forming flight control surfaces and movable forward and aft relative to the wing by a flight control mechanism coupled to the trailing edge device through a kinematic linkage, the trailing edge device being movable by the flight control mechanism and the kinematic linkage between forward and aft end positions, wherein the method comprises:

removing and replacing part of the kinematic linkage so that a new forward end position of the trailing edge device, displaced rearwardly with respect to the previous forward end position of the trailing edge device prior to modification of the airfoil, is obtained and the aft end position of the trailing edge device remains unchanged, a gap being formed in the surface of the airfoil on the underside of the airfoil and directly in front of the trailing edge device when the trailing edge device is in the new forward end position; and, installing a void filling structure to close the gap, and wherein with the trailing edge device in the forward end position, the modified airfoil has a greater lift-to-drag ratio than prior to the modifications thereof.

24. The method according to claim 23 wherein the part of the kinematic linkage which is removed is a push-pull rod, and the corresponding part of the kinematic linkage substituted therefor is a self-adjusting push-pull rod, the self-adjusting push-pull rod having a length which changes during movement of the trailing edge device from the aft end position to the new forward end position by operation of the flight control mechanism.

25. The method according to claim 23 wherein the trailing edge device is guided by a track during movement thereof between the forward end and aft end positions, and a stop is fixed to the track to stop the forward movement of the trailing edge device at the forward end position.

26. The method according to claim 25 wherein the self-adjusting push-pull rod is telescopic and extensible from a minimum length condition against the action of a spring associated with the rod.

27. The method according to claim 24 wherein the self-adjusting push-pull rod is telescopic and includes a spring configured to urge the rod to a maximum length condition, the rod being compressed against the resistance of the spring when the flight control mechanism is operated to move the trailing edge device into the aft end position.

28. An airfoil comprising:

a leading edge and a trailing edge;

an upper surface and a lower surface extending between the leading and trailing edges;

a chord length defined by the leading and trailing edges;

a camber defined by the leading and trailing edges;

a flight control surface member as an integral part of the trailing edge of the airfoil;

a control mechanism coupled to the flight control surface member by a self-adjusting push-pull rod and operable to move the flight control surface member between forward and aft end positions;

the self-adjusting push-pull rod having a length which is increased when the flight control surface member is moved from the aft end position to the forward end position by the control mechanism.

29. An airfoil according to the claim 28 wherein the flight control surface member is guided by a track during movement thereof between the forward and aft end positions, and a stop is fixed to the track to stop the forward movement of the flight control surface member at the forward end position.

30. An airfoil according to claim 29 wherein the self-adjusting push-pull rod is telescopic and extensible from a minimum length condition against the action of a spring included in the rod.

31. An airfoil according to claim 28 wherein the self-adjusting push-pull rod is telescopic and includes a spring arranged to urge the rod to a maximum length condition, the rod being configured to be compressed against the force of the spring when the control mechanism is operated to move the flight control surface member into the aft end position.

32. An aircraft having an airfoil as defined in claim 28.

* * * * *